Figure 1:
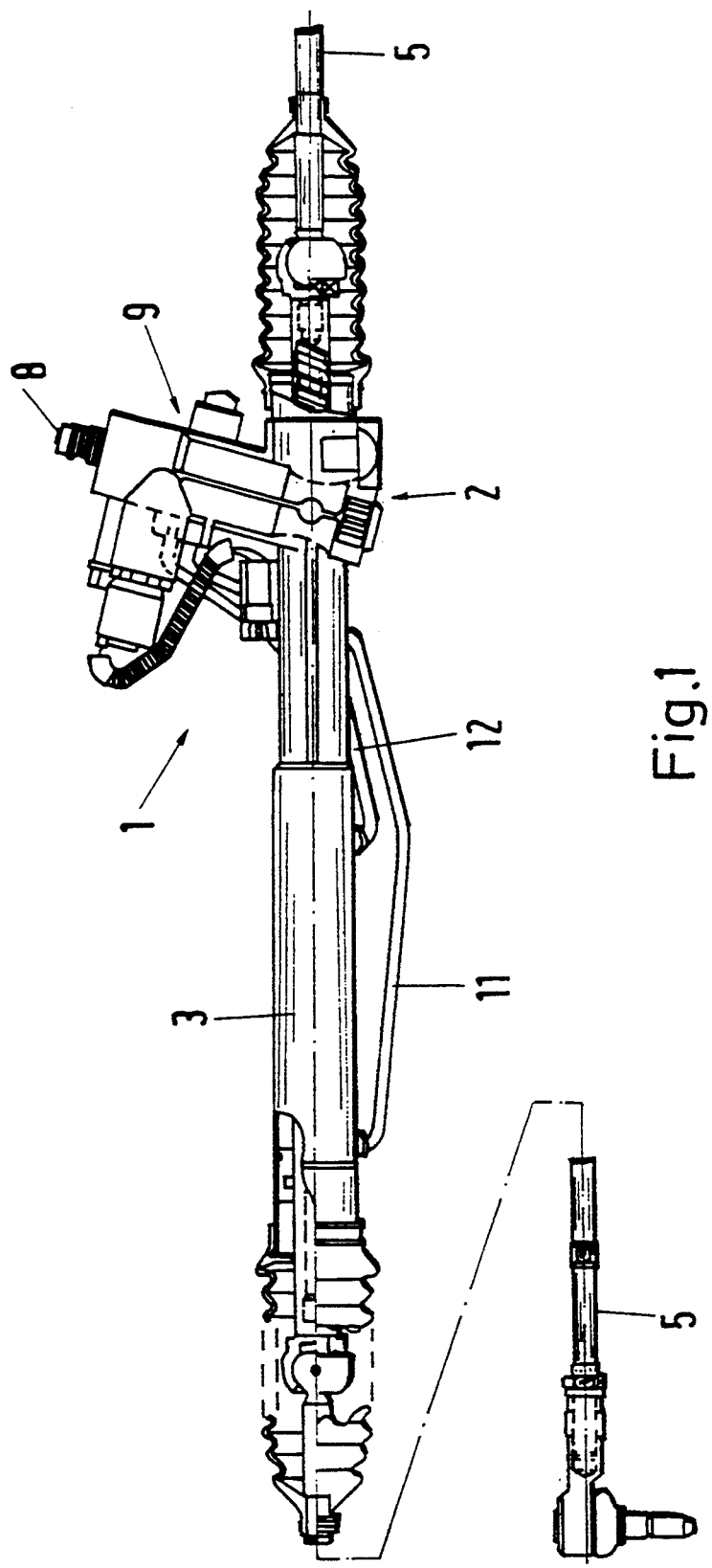

United States Patent [19]
Eberhart

[11] Patent Number: 5,339,917
[45] Date of Patent: Aug. 23, 1994

[54] POWER STEERING DEVICE

[75] Inventor: Eugen Eberhart, Düsseldorf, Fed. Rep. of Germany

[73] Assignee: TRW Fahrwerksysteme GmbH & Co. KG, Dusseldorf, Fed. Rep. of Germany

[21] Appl. No.: 1,846

[22] Filed: Jan. 8, 1993

[30] Foreign Application Priority Data

Jan. 18, 1992 [DE] Fed. Rep. of Germany ....... 4201311

[51] Int. Cl.$^5$ .............. B62D 5/083; F15B 13/043
[52] U.S. Cl. .................. 180/143; 180/142; 180/146; 180/149; 91/375 A; 137/625.23
[58] Field of Search .......... 180/132, 141, 142, 143, 180/146, 147, 161, 149; 91/375 A; 137/625.23, 625.24

[56] References Cited

U.S. PATENT DOCUMENTS

| | | | |
|---|---|---|---|
| 4,570,735 | 2/1986 | Duffy | 180/142 |
| 4,796,715 | 1/1989 | Futaba et al. | 91/375 A X |
| 4,819,545 | 4/1989 | Dymond | 91/375 A X |
| 4,858,712 | 8/1989 | Neff | 180/143 |
| 4,905,784 | 3/1990 | Yamashita | 180/143 |
| 5,046,573 | 9/1991 | Jones | 180/143 |
| 5,046,574 | 9/1991 | Goodrich, Jr. et al. | 180/143 |
| 5,070,958 | 12/1991 | Goodrich, Jr. et al. | 180/143 |
| 5,086,687 | 2/1992 | Elser et al. | 91/375 A |
| 5,107,752 | 4/1992 | Elser et al. | 91/375 A |
| 5,168,949 | 12/1992 | Emori et al. | 180/143 |

FOREIGN PATENT DOCUMENTS

| | | |
|---|---|---|
| 3523293 | 1/1986 | Fed. Rep. of Germany . |
| 4026163 | 3/1991 | Fed. Rep. of Germany . |
| 4119913 | 1/1992 | Fed. Rep. of Germany . |

*Primary Examiner*—Margaret A. Focarino
*Assistant Examiner*—Florian Zeender
*Attorney, Agent, or Firm*—Tarolli, Sundheim & Covell

[57] ABSTRACT

A power steering device supplies hydraulic oil to the left and right chambers (6,7) of a servo cylinder (3) by means of a pump (10) via a rotary slide valve (9), whereby a reaction piston (18) that is stressed by a pressure spring (19) is arranged between an input shaft (14) and a control sleeve (15) of the rotary slide valve (9). In order to create a simply constructed hydraulic reaction system for this power steering device, it is suggested that a ratio pressure control valve (VDRV) (30) to reduce the system pressure (P) to a lower reaction pressure (P2) and a variable stop (29) to control the hydraulic retroactive moment as a function of the speed are arranged in a line (31) between the pump (10) and the rear side of the reaction piston (18) that is stressed by the pressure spring (19). The invention furthermore suggests that a variable stop (34) to control the return pressure (PR) as a function of the speed is arranged in a line (PR) between the front side of the reaction piston (18) and a tank (27).

6 Claims, 5 Drawing Sheets

POWER STEERING DEVICE

The invention pertains to a power steering device to supply hydraulic oil to the left and right chambers of a servo cylinder by means of a pump via a rotary slide valve, whereby a reaction piston that is stressed by a pressure spring and can be moved in axial direction is arranged between an input shaft and a control sleeve of the rotary slide valve, and the reaction piston is supported to be axially movable and rotationally fixed on the input shaft and connected with the control sleeve via an elastic rotary slaving.

A power steering device of the previously described type is known from the U.S. Pat. No. 4,819,545. This power steering device has proven itself in practical applications, but has the disadvantage that the road contact is not only compensated up to a mechanical base load adjusted by a torsion bar at very slow speeds, for example during parking, but is practically cancelled at increased speeds as compared to a manual steering system.

Originating from these facts, the invention is based on the objective of creating a simply constructed hydraulic reaction system for a power steering device of this type by means of which the steering force can be controlled more accurately as a function of the vehicle speed to obtain an improved steering feeling at higher speeds.

The technical solution suggested for this objective consists of the fact that a ratio pressure control valve to reduce the system pressure to a lower reaction pressure and a variable stop to control the retroactive hydraulic moment as a function of the speed are arranged in a line between the pump and the rear side of the reaction piston that is stressed by a pressure spring, and that a variable stop to control the retroactive pressure as a function of the speed is arranged in a line between the front side of the reaction piston and a tank.

A further variation of the invention suggests arranging a cut-off valve to limit the maximum reaction pressure between the line to the rear side of the reaction piston and the line to the tank.

It is furthermore suggested to arrange a relief hole between an annular space for the pressure spring on the rear side of the reaction piston and the inner space of the input shaft.

In order to seal the annular space for the pressure spring on the rear side of the reaction piston, it was established that it is practical to arrange a sealing piston between the input shaft and a steering box, and to brace the pressure spring against this sealing piston. It is furthermore possible to arrange a hole for leaking oil on the rear side of the sealing piston in the input shaft in order to return the leaking oil into the tank.

The power steering device constructed according to the invention makes it possible to accurately control the steering force under practically all conditions by means of a hydraulic reaction system as a function of the vehicle speed. One advantage of this power steering device with hydraulic reaction system can be seen in the fact that it makes "parking with one finger" possible once the mechanical base load produced on the reaction piston by means of the pressure spring is compensated by closing the variable stop and blocking the retroactive pressure. The compensation of the mechanical base load produced by the pressure spring can be returned into the hydraulic reaction circuit at increasing vehicle speeds by opening both variable stops in the hydraulic reaction circuit. The reaction pressure can be maintained at a constant level by a correspondingly dimensioned relief hole in the input shaft during linear movement of the vehicle without steering maneuvers. However, once a steering maneuver is initiated, the increased system pressure effects a retroactive moment onto the input shaft before the reaction chamber via the variable stop, whereby the retroactive moment counteracts the input moment and the thus produced system pressure.

Figure 2:
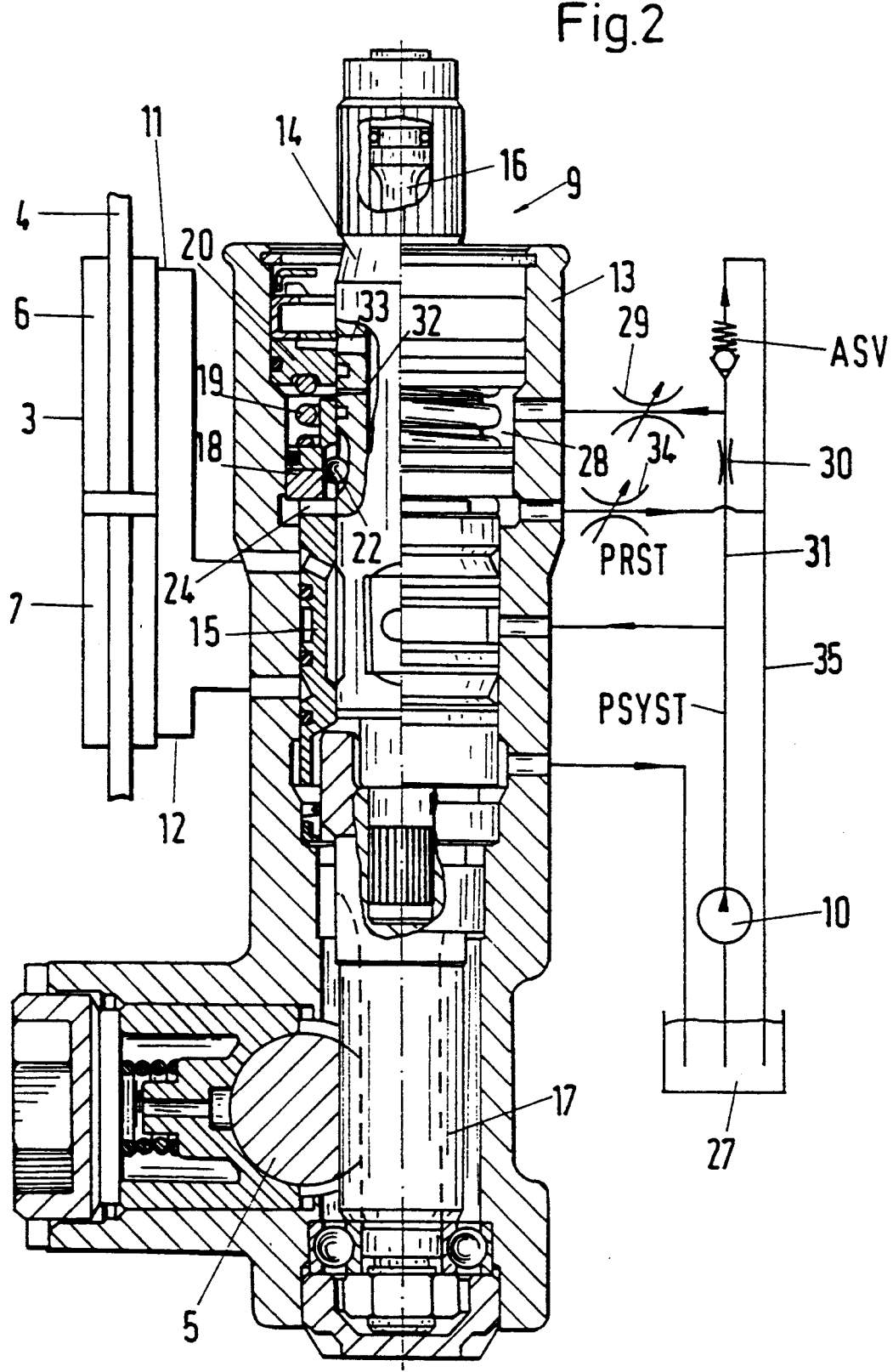
Figure 3:
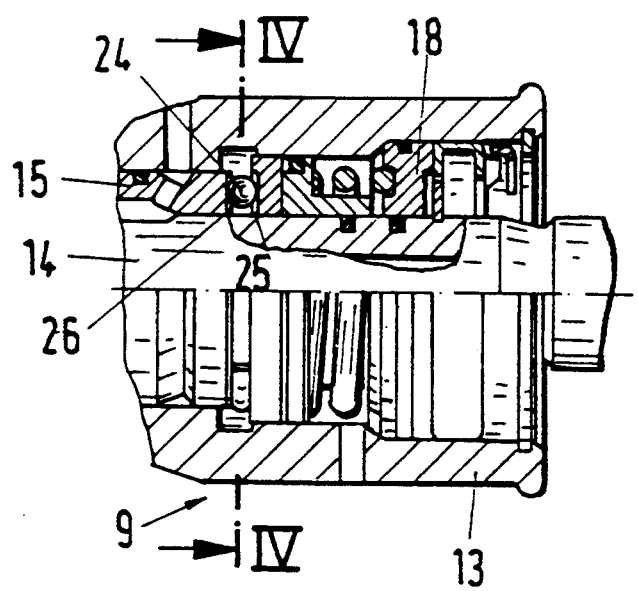
Figure 4:
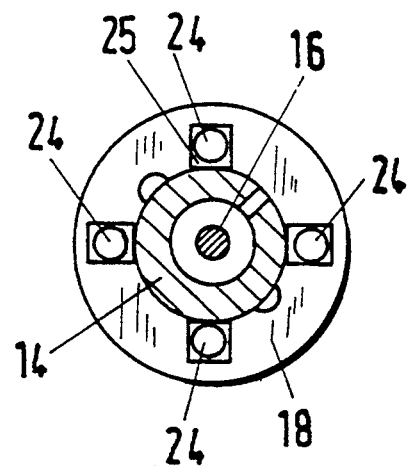
Figure 5:
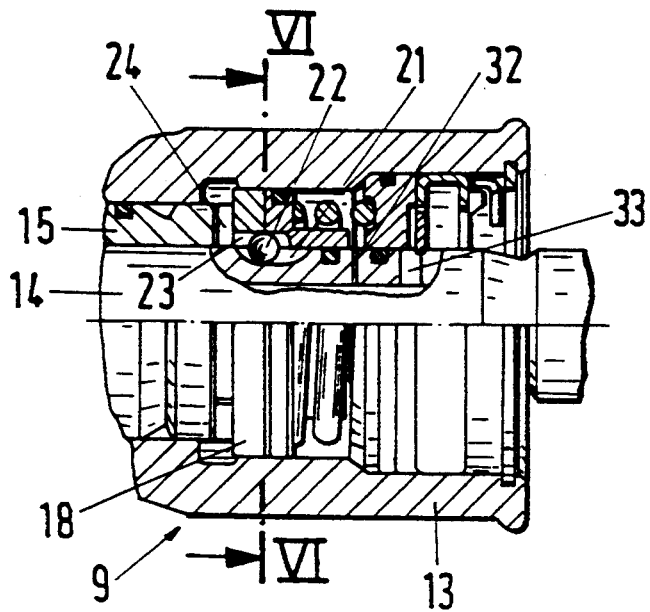
Figure 6:
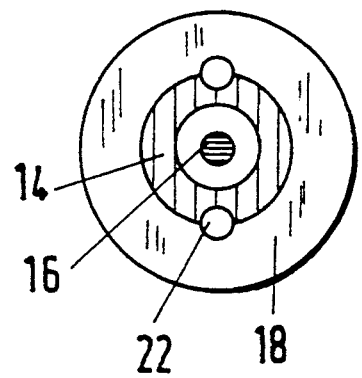
Figure 7:
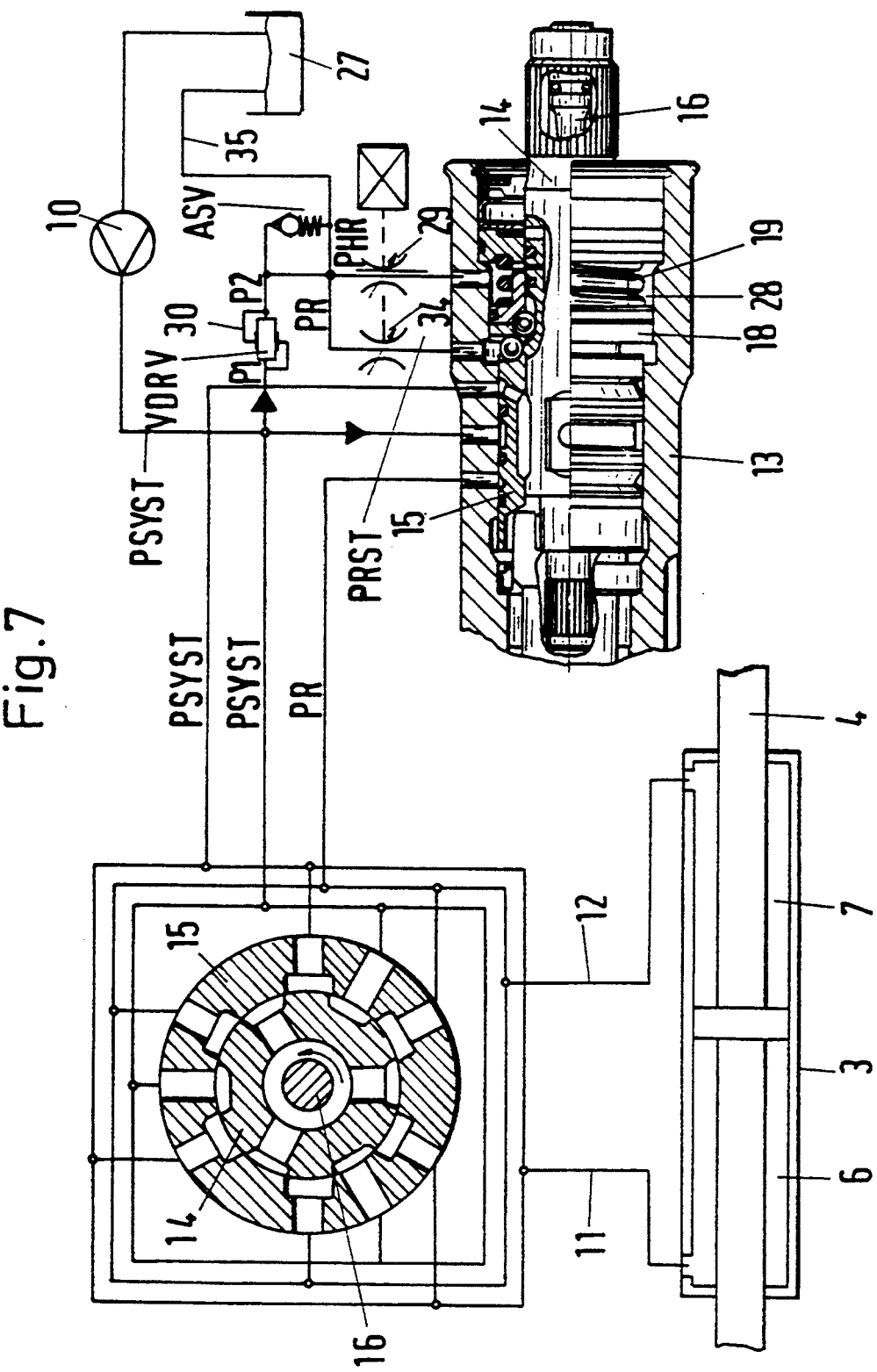

Further details and advantages of the invention result from the following description and the corresponding figures in which the power steering device constructed according to the invention and a hydraulic diagram are schematically illustrated. The figures show:

FIG. 1 a view of a power steering device;

FIG. 2 a steering box of the power steering device in a longitudinal section;

FIG. 3 a detail of the steering box with an elastic rotary slaving between the control sleeve and the reaction piston in a longitudinal section;

FIG. 4 the same detail in a cross section along the line IV—IV in FIG. 3;

FIG. 5 a detail of the steering box with an axially movable rotation lock of a reaction piston on a control sleeve in a longitudinal section;

FIG. 6 the same detail in a cross section along the line VI—VI in FIG. 5;

FIG. 7 a hydraulic diagram for the power steering device, and

Figure 8:
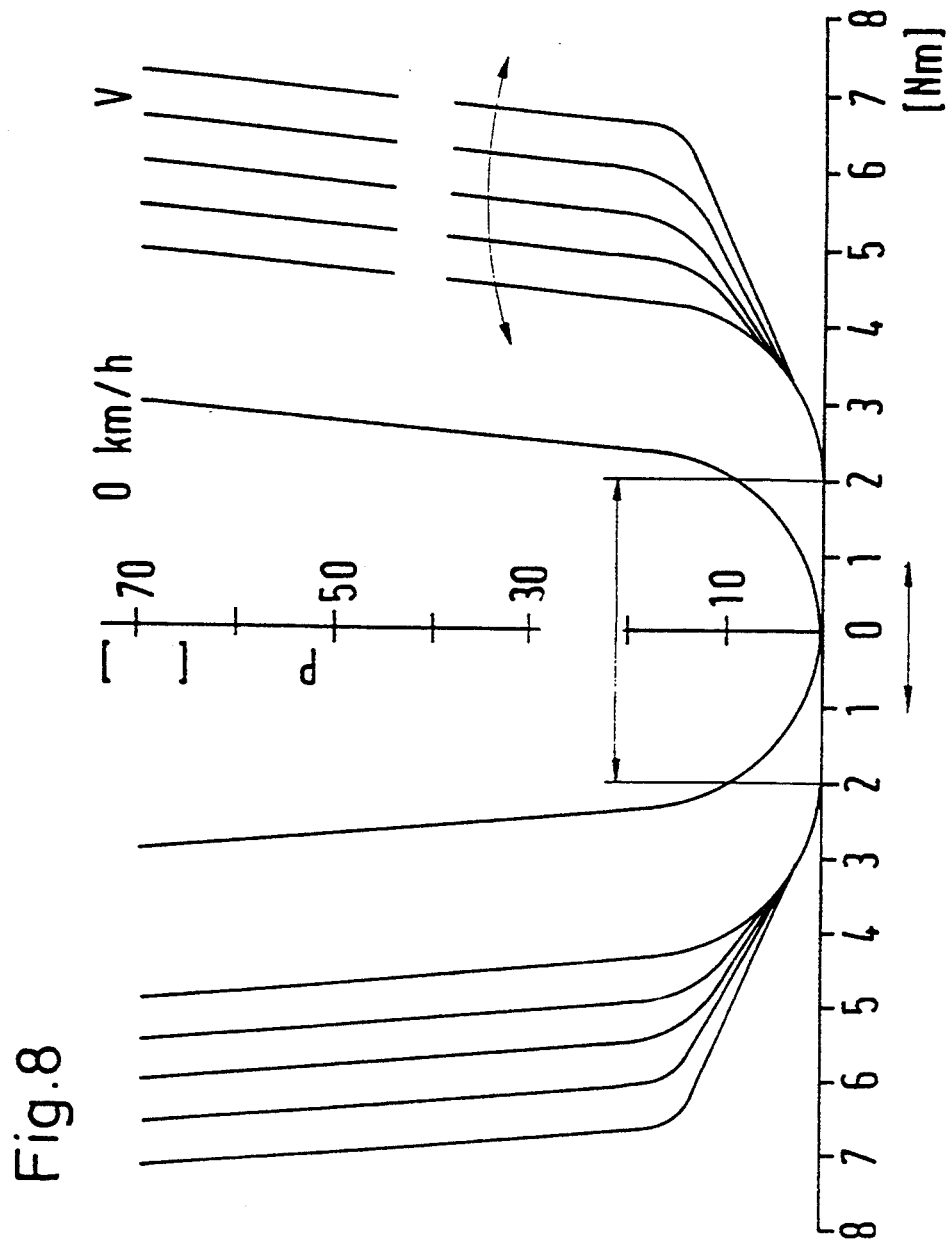

FIG. 8 a diagram of characteristic lines for the power steering device.

A power steering device (1) is used in connection with a mechanical steering system (2) in order to reduce the steering moment to be applied onto a steering wheel. This is obtained by means of a servo cylinder (3), the piston rod (4) of which is connected with a tie rod (5). The two chambers (6 and 7) of the servo cylinder (3) are charged via a rotary slide valve (9) arranged on a steering column (8) with hydraulic oil as a function of the extent of the rotation of the steering wheel by a pump (10) via lines (11,12).

The conventionally constructed rotary slide valve (9) consists of a steering box (13) firmly attached to the frame of the vehicle with an input shaft (14) arranged within it and a control sleeve (15) supported on it. Once a rotational moment is applied via the steering column (8), the input shaft (14) can be turned in both directions by an angle of approximately 3° to 4°. This rotational movement counteracts the torsion moment of a torsion bar (16) which is connected with the input shaft (14) as well as with a driving pinion (17) which in turn moves the tie rod (5) via a steering rack.

In order to obtain the desired variation of the steering moment as a function of the speed, namely a reduced steering moment during parking and an increased steering moment at higher speeds, the desired steering moment to turn the input shaft (14) is made adjustable relative to the control sleeve (15) by means of a device described in the following. An axially movable and elastic rotary slaving is arranged between the input shaft (14) and the control sleeve (15) by means of which the torsion bar (16) Which otherwise would solely determine the hydraulic steering moment can be bypassed.

A reaction piston (18) is supported in an axially movable manner against a pressure spring (19) within an annular space between the steering box (13) and the input shaft (14). The pressure spring is braced at its other end against a sealing piston (20). The axially movable attachment of the reaction piston (18) on the input shaft (14) consists of longitudinal grooves (21) arranged in the input shaft (14) and spheres (22) that are arranged within these grooves and engage into the open longitudinal grooves (23) in the reaction piston (18).

The elastic rotary slaving between the reaction piston (18) and the control sleeve (15) consists of spheres (24) arranged between the face sides of the two aforementioned components that brace themselves on both sides in V-shaped recesses (25,26).

If the speed of the vehicle is increased, the pressure spring (19) presses the reaction piston (18) against the control sleeve (15) via the spheres (24) and thus effects an increased locking effect of the input shaft (14) and the control sleeve (15) which can only be overcome with an additional steering moment. The spheres (24) must for this purpose be lifted out of their V-shaped recesses (25,26) against the spring force, which is realized at the steering wheel as an increased input moment. This represents a desired effect in order to obtain a reduced servo effect and an improved response from the road at increased speeds.

The mechanical base load predetermined by the pressure spring (19) and thus the steering moment can be compensated during parking by the fact that a stop (PRST) that is variable as a function of the speed of the vehicle is arranged in a line (PR) that serves for the return of the hydraulic oil. The stop blocks the return of the hydraulic oil to a tank (27). This means that the reaction piston (18) is pushed against the pressure spring (19) and that the mechanical base load is compensated. The steering moment is now solely determined by the torsion bar (16).

In order to convey improved information about the contact with the road, a stop (29) that is variable as a function of the vehicle speed and, if so desired, further parameters such as the extension of the steering wheel rotation or yaw acceleration is arranged between the system pressure in the servo cylinder (3) and a reaction space (28) between the reaction piston (18) and the steering piston (20). The supply of the hydraulic oil to the reaction space (28) is executed via a ratio pressure control valve (30) that regulates the system pressure from a maximum of 120 bar to a reaction pressure of no more than 15 bar. The stop (29) and the ratio pressure control valve (30) are arranged in a line (31) that is connected to a system pressure line (PSYST) originating from the pump (10). The maximum reaction pressure of 15 bar is limited by a cut-off valve (ASV) that connects the line (31) with the tank (27).

The return of the hydraulic oil from the servo cylinder (3) and the rotary slide valve is executed via the line (PR) to the tank (27). A relief hole (32) for the reaction space (28) in the input shaft (14) and a hole (33) for leaking oil on the rear side of the sealing piston (20) are also connected with the tank (27).

The return of the hydraulic oil can be blocked during parking by closing the variable stop (PRST), and the mechanical base load of the pressure spring (19) can be compensated in order to ensure "steering with one finger." The other variable stop (29) is entirely closed during this process, and the reaction space (28) has the same pressure as the return pressure (PR) of the tank (27) because of the relief hole (32). Both variable stops (29 and 34) are increasingly opened at increasing speeds in order to reduce the compensation of the spring force. The reaction pressure in the reaction space (28) is maintained on the return pressure level via the relief hole (32) during linear movement without steering maneuvers. However, if a steering maneuver is initiated, the increased system pressure effects a retroactive moment via the variable stop (29) and via the reaction piston (18) that counteracts the input moment. According to the diagram of characteristic lines illustrated in FIG. 8, this hydraulic reaction can be used to reduce the servo effect and thus improve the contact between the steering wheel and the road.

The cut-off valve (ASV) limits the maximum retroactive pressure in the reaction space (28) and thus also a further increase of the retroactive moment. This means that the maximum steering moment to be applied is limited, and that it is ensured that sufficient servo effect is always available when needed at higher speeds, for example when avoiding collisions with other vehicles, tire defects and so forth.

LIST OF REFERENCE NUMERALS

1 Power steering device
2 Steering mechanism
3 Servo cylinder
4 Piston rod
5 Tie rod
6 Chamber
7 Chamber
8 Steering column
9 Rotary slide valve
10 Pump
11 Line
12 Line
13 Steering box
14 Input shaft
15 Control sleeve
16 Torsion bar
17 Driving pinion
18 Reaction piston
19 Pressure spring
20 Sealing piston
21 Longitudinal grooves
22 Sphere
23 Longitudinal groove
24 Sphere
25 Recesses
26 Recesses
27 Tank
28 Reaction space
29 Stop
30 Ratio pressure control valve
31 Line
32 Relief hole
33 Hole for leaking oil
34 Stop
35 Line
PR Return pressure
PRST Return steering pressure
PSYST System pressure
ASV Cut-off valve
VDRV Ratio pressure control valve
PHR Reaction pressure

I claim:

1. Power steering device to supply hydraulic oil to a left chamber (6) of a servo cylinder (3) and a right chamber (7) of the servo cylinder (3) by means of a pump (10) via a rotary slide valve (9), whereby a reaction piston (18) that is stressed by a pressure spring (19) is arranged between an input shaft (14) and a control sleeve (15) of the rotary slide valve (9), and whereby the reaction piston that is movable in an axial direction and supported rotationally fixed on the input shaft (14) is connected with the control sleeve (15) via an elastic rotary slaving, characterized by a ratio pressure control valve (VDRV) (30) to reduce a system pressure (p1) a lower reaction pressure (p2) and a variable stop (29) to control a hydraulic retroactive moments in dependence of a speed are arranged in a line (31) between the pump (10) and a rear side of the reaction piston (18) that is stressed by the pressure spring (19), and that a variable stop (34) to control a return pressure (PR) as a function of the speed is arranged in a line (35) between a front side of the reaction piston (18) and a tank (27).

2. Power steering device according to claim 1 characterized by a cut-off valve (ASV) to limit a maximum reaction pressure (p2) is arranged between the line (31) to the rear side of the reaction piston (18) and a line (PR) to the tank (27).

3. Power steering device according to claim 1, characterized by a relief hole (32) arranged between a reaction space (28) from the pressure spring (19) on the rear side of the reaction piston (18) and an inner space of the input shaft (14).

4. Power steering device according to claim 1, characterized by the pressure spring (19) braced against a front side of a sealing piston (20).

5. Power steering device according to claim 1, characterized by a hole (33) for leaking oil and arranged in the input shaft (14) on a rear side of a sealing piston (20).

6. Power steering device according to claim 4, characterized by a hole (33) for leaking oil and arranged in the input shaft (14) on a rear side of the sealing piston (20).

* * * * *

UNITED STATES PATENT AND TRADEMARK OFFICE
CERTIFICATE OF CORRECTION

PATENT NO. : 5,339,917
DATED : August 23, 1994
INVENTOR(S) : Eugen Eberhart

It is certified that error appears in the above-indentified patent and that said Letters Patent is hereby corrected as shown below:

Column 5, line 5, after "(p1)" insert --to--.

Column 5, line 7, change "moments" to --moment--.

Signed and Sealed this

Thirty-first Day of January, 1995

Attest:

BRUCE LEHMAN

Attesting Officer     Commissioner of Patents and Trademarks